Dec. 1, 1942.   W. L. WRIGHT   2,303,781
PROJECTOR MECHANISM
Filed Nov. 16, 1939   3 Sheets-Sheet 1

Inventor
WALTER L. WRIGHT
By
His Attorney

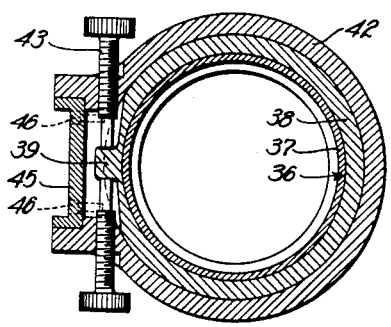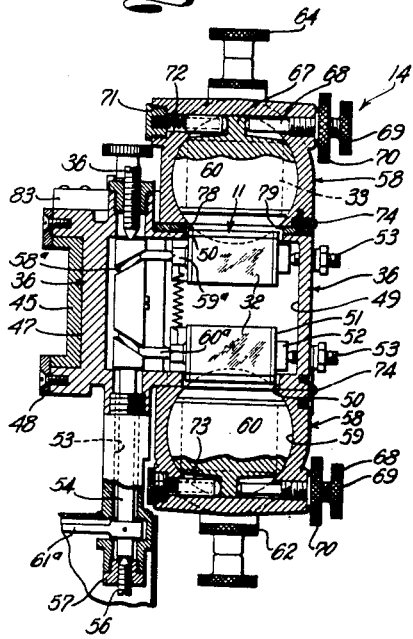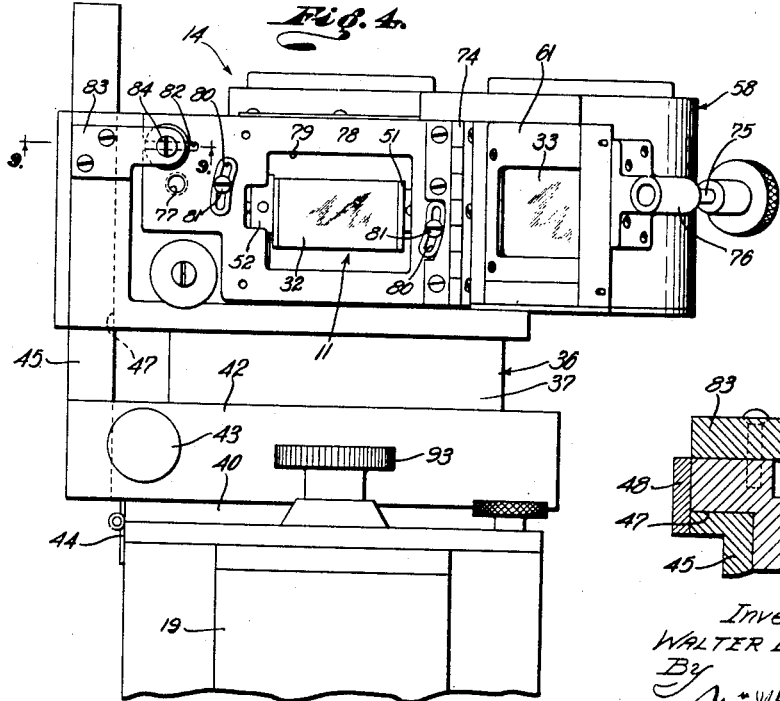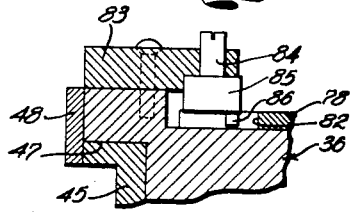

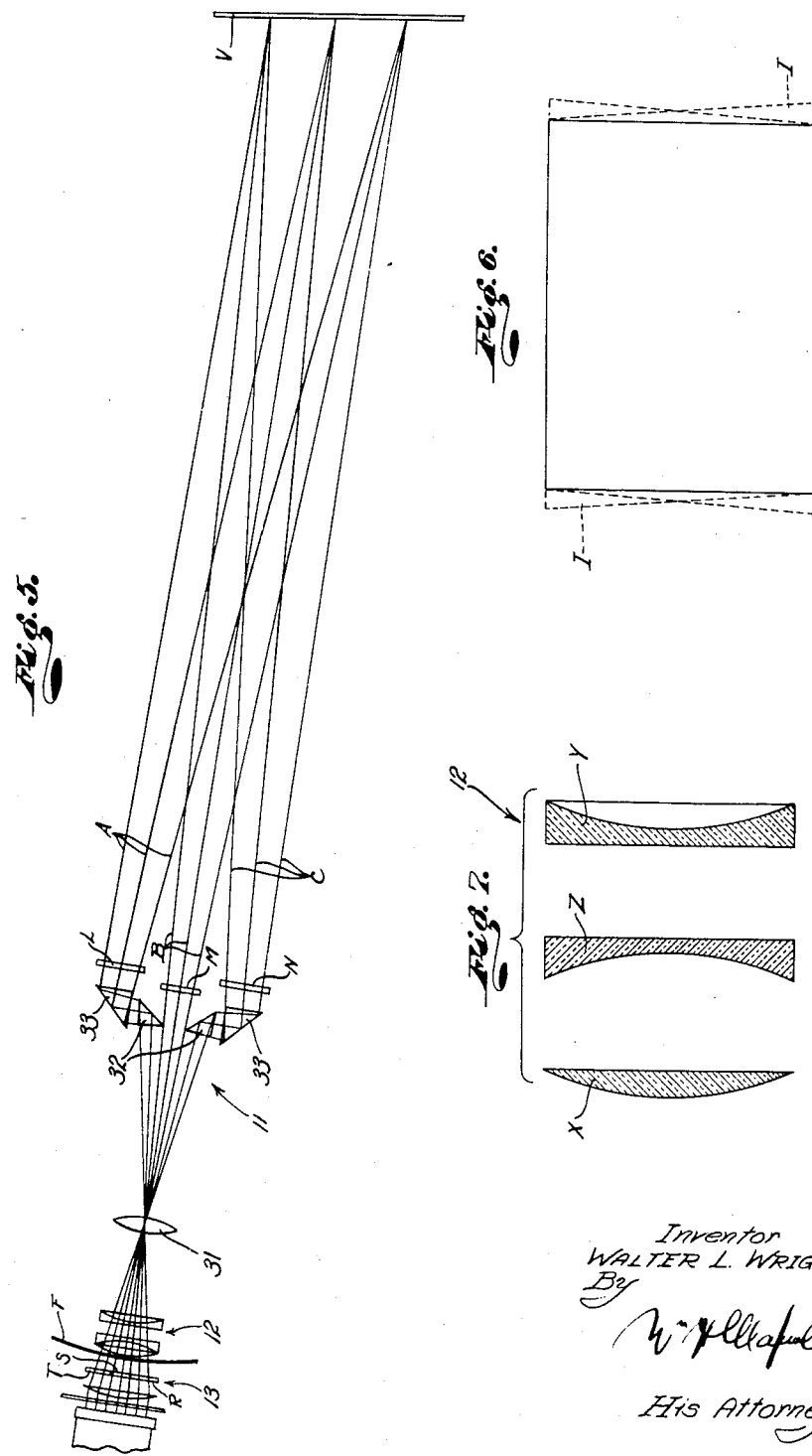

Patented Dec. 1, 1942

2,303,781

UNITED STATES PATENT OFFICE 2,303,781

PROJECTOR MECHANISM

Walter L. Wright, Santa Monica, Calif., assignor to Synchrome Corporation, a corporation of California Application November 16, 1939, Serial No. 304,664

10 Claims. (Cl. 88—16.4)

This invention relates to stereoptican and motion picture projectors and relates more particularly to a projector for use in the additive color method of projecting natural color or multicolored pictures. A general object of this invention is to provide a projector of the character referred to in which the various optical elements and optical assemblies may be readily and accurately regulated and adjusted.

Another object of this invention is to provide a projector of the character referred to embodying reflecting elements or prisms for directing the light images from the end picture areas of a series of positive pictures of the film to bring such images into registration with the central light image, which is characterized by novel means for supporting the prisms for individual adjustment longitudinally of the optical axis and about axes parallel to the optical axis to correct the positions of the horizontal and vertical meridians of the end picture images.

Another object of this invention is to provide a projector mechanism of the character referred to in which at least one of the reflectors for handling the end picture images is supported for adjustment about an axis transverse of the optical axis of the projector so that it may be adjusted to assist in aligning or registering the vertical meridians of the light images.

A further object of this invention is to provide a motion picture projector for handling film bearing series of pictures each series comprising a plurality of pictures of different color values of a subject taken simultaneously from a single point of vision that embodies means for effecting the individual and accurate adjustment of the various optical elements of the film handling parts to assure the most effective projection of the multicolor pictures.

Figure 1:
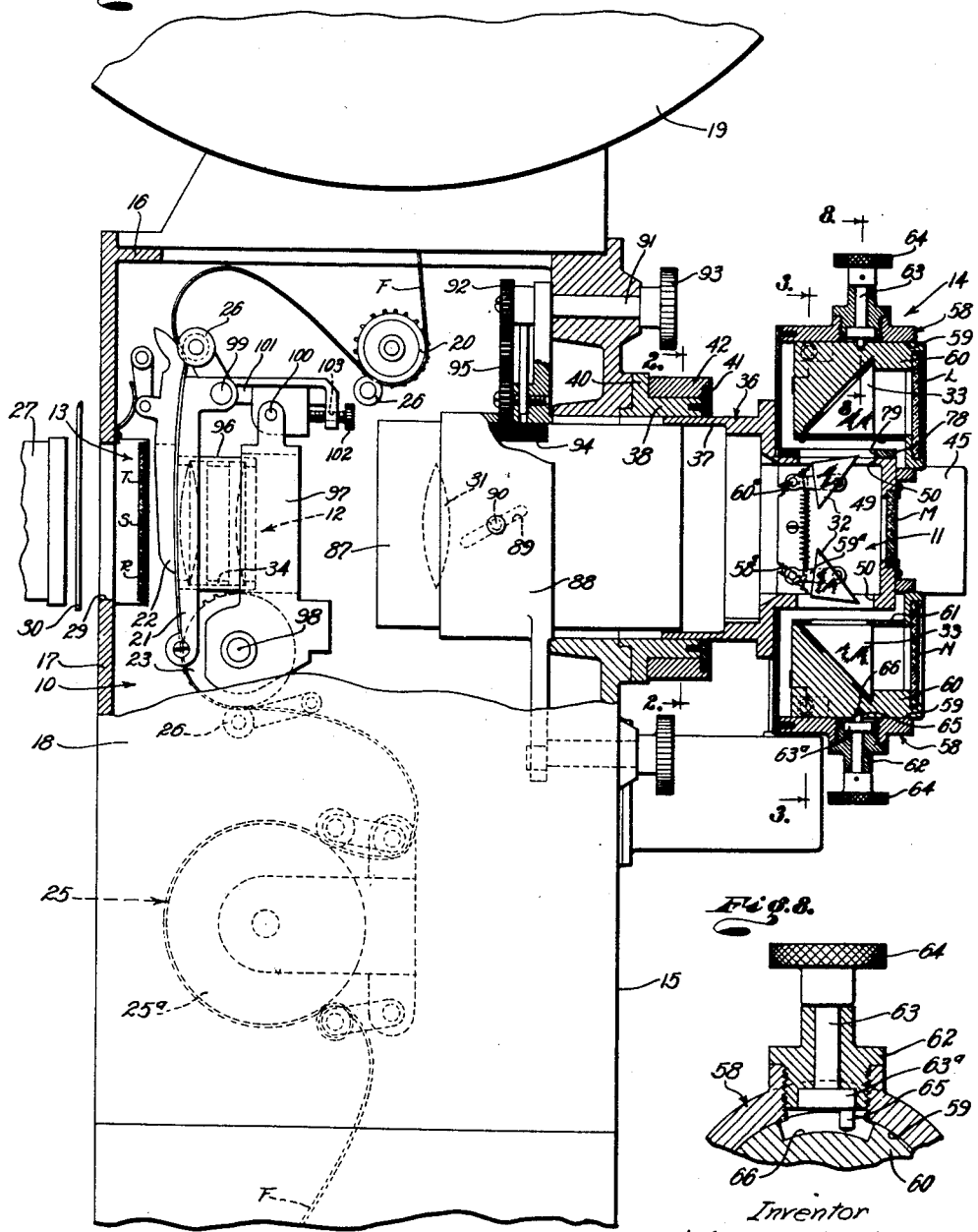
Figure 8:
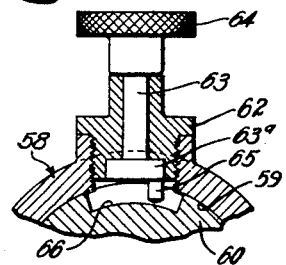

The various objects and features of my invention will be fully understood from the following detailed description of a typical preferred form and application of the invention, throughout which description reference is made to the accompanying drawings, in which:

Fig. 1 is a fragmentary side elevation of a projector of the invention with a portion broken away to illustrate certain of the parts in vertical cross section. Fig. 2 is a vertical detailed sectional view taken as indicated by line 2—2 on Fig. 1. Fig. 3 is a fragmentary vertical detailed sectional view taken as indicated by line 3—3 on Fig. 1. Fig. 4 is a fragmentary top or plan view of the projector with one of the optical carriers in an open position. Fig. 5 is a diagrammatic view of the optical system of the projector illustrating the manner in which the light images are projected onto the viewing screen. Fig. 6 is a diagrammatic view illustrating the manner in which the optical system corrects distortion in the shape of the images. Fig. 7 is a longitudinal sectional view of the corrective lens unit with the elements in spaced relation. Fig. 8 is an enlarged fragmentary vertical detailed sectional view taken as indicated by line 8—8 on Fig. 1, and Fig. 9 is an enlarged fragmentary vertical detailed sectional view taken as indicated by line 9—9 on Fig. 4.

The present invention may be embodied in optical lanterns of stereopticans and in motion picture projectors where a plurality of positive images of different color values are simultaneously projected through suitable color filters to fall on a viewing screen in superimposed relation and in true registration to form a natural color or multi-color picture. The features of the invention may be incorporated in projectors for handling transparent positive image bearing plates or films varying considerably in character. In the case of motion picture projectors the present invention may be embodied in a projector for handling film having the series of picture areas of different color values arranged transversely of the film, or the invention may be embodied in a projector for handling a motion picture film in which the series of pictures of different color values are arranged longitudinally of the film. In the following detailed description I will describe a typical preferred form of the invention intended primarily for handling motion picture film in which the series of pictures of different color values are arranged longitudinally of the film. It is to be understood that the invention is not to be construed as limited or restricted to the specific form or application about to be described, but is to be taken as including any features or modifications that may fall within the scope of the claims.

The projector of this invention may be said to comprise, generally, film handling means 10, an optical system 11 for simultaneously projecting three images of different color values, carried by the film F, onto a viewing screen V to fall in registration on the screen, and means 14 supporting various elements of the optical system 11 for regulation and adjustment.

The various elements of the projector are housed and carried by a case. The portion of the case illustrated includes a front wall 15, a top 16, a rear wall 17, and sides 18. A suitable film magazine 19 is arranged on the case top 16 to contain the film F bearing series of picture images of different color values. The film handling means 10 includes a continuously rotating power driven sprocket 20. The sprocket 20 is within the case adjacent its top 16 and the film F is trained under the sprocket to be advanced thereby. The film F passes from the sprocket 20 to a film guide or gate 21 which holds the film in position for the projection of the light, A spring held guide or retainer 22 is associated with the gate 21 to hold the film against wrinkling or buckling when in engagement with the gate. The film F passes over the gate 21 to have its picture areas in the correct relation to the aperture of the gate and to the optical system 11. An intermittently operated film advancing sprocket 23 is positioned below and adjacent the gate 21 to give the film the required intermittent movement.

The film handling means 10 preferably further includes a compensating means 25 for acting on or adjusting certain elements of the optical system 11 to compensate for variations in the spacing and size of the picture areas resulting from shrinkage of the film. This compensating means 25 includes a large constantly rotated sprocket 25a spaced below the intermittent advancing sprocket 23. The details of the compensating means 25 and its mode of operation are fully described and illustrated in Patent No. 2,028,484, granted June 21, 1936. Suitable guide rollers 26 serve to hold the film F in the desired engagement with the sprockets 20 and 23 and the gate 21. The film F upon leaving the compensating means 25 passes downwardly in the case to the sound reproduction means and the take-up magazine (not shown).

The optical system 11 includes a light source 27 spaced from the opening 29 in the rear wall 17 of the case, and a suitable shutter 30 in front of the light source 27 is operated in the required synchronism with the film advancing sprocket 23. A suitable projection lens 31 is spaced in front of the film gate 21 to receive the light passed forwardly through the picture areas of the film F from the light source 27. I employ a single projection lens 31 and the lens is preferably corrected for chromatic aberration. The projection lens 31 is supported for adjustment along the axis of the optical system 11 as will be later described.

The optical system 11 further includes sets or pairs of prisms 32 and 33 for bending or directing the light images or beams A and C of the end picture areas outwardly and then inwardly and forwardly so that they diverge to fall on the screen V in registration with the light image B from the central or intermediate picture area of the film. The reflectors or prisms 32 and 33 are spaced in front of the projection lens 31 and one pair of prisms 32 and 33 is above the axis of the optical system 11 while the other pair of prisms is below the axis of the system. The prisms 32 are positioned to intercept the light beams A and C from the end picture areas after they have passed through the projection lens 31 and serve to direct the beams outwardly or laterally relative to the central axis of the optical system. The prisms 33 are the outer prisms and are spaced outwardly from the prisms 32. The outer prisms 33 serve to reflect the outwardly directed light beams A and C forwardly in converging relation to fall on the screen V in register with the image B from the intermediate picture area of the film. The prisms 32 and 33 are individually adjustable and are adjustable as a group or unit by the means 14, as will be later described.

A lens unit 12 is provided to correct the distortion in the shape of the images A and C of the end picture areas that results from the shortening of travel of the end or outer portions of these images and serves to prevent distortion in the shape of the composite multicolored image that may result when the angle of projection is not normal to the plane of the screen V. Fig. 6 illustrates the manner in which the images are distorted by shortening their paths of travel. The broken lines I of this figure are the margins of the distorted images. The unit 12 is an assembly or combination of lens elements and in accordance with the invention is positioned in the optical axis of the apparatus immediately adjacent to the film track or gate 21. The optical unit 12 includes a plano-convex lens X, a plano-concave lens Y, both of spherical curvature, and a minus lens Z of cylindrical curvature, (see Fig. 7). The unit 12 is fully described and claimed in my copending application Serial No. 357,774, filed September 21, 1940.

The lenses X, Y and Z may be formed of transparent material or glass of selected or different refractive indices. However, I have obtained satisfactory results by forming the lens elements of the unit 12 of crown glass having a refractive index of approximately 1.5. The lens unit 12 is positioned immediately adjacent the film gate 21 to have a local or immediate effect upon the light projected through the film F. With the unit 12 close to the film, the light falls upon the spherical surface of the lens X immediately after passing through the film F so that the light rays from a given point on the film are confined to a small part of the spherical surface of the lens X assuring a maximum effect upon each part of each image. It will be observed that the gate 21 is formed to hold a portion of the film F curved. This serves to hold the film against buckling and the curvature of the film is related to the elements of the corrective optical unit 12 to obtain the best results with the unit. The portion of the film F through which the light is projected is held curved by the gate 21 so that it presents a concave side to the corrective lens unit 12. The unit 12 is adjustably supported for regulation or adjustment as will be later described.

A color filter means 13 is provided to chromatically influence the individual light beams A, B and C projected through the picture areas of different color values to produce a natural color or multicolor composite image on the viewing screen V. Further, the means 13 operates to eliminate or render unobjectionable the light images falling outside the field of the viewing screen V that result from the passage of marginal light from one picture area or image of the film through the optical elements intended to handle the light from another picture area. The filter means 13 includes color filters L, M and N arranged in the path of the beams A, B and C, respectively. The filter L is preferably positioned in front of the prism 33 handling the light beam A, the filter M is arranged in the front portion of the projector in the optical axis of the apparatus to act on the middle light beam B, while the filter N is preferably positioned in front of the prism 33 that reflects the light beam C. The filters L, M and N have different color values and filters of different or selected colors may be employed as desired. In the particular case illustrated it will be assumed that the filter L is green, the filter M violet and the filter N orange. With this arrangement of filters the light shaft A is the light projected through the picture area of the green color value, the shaft or beam B is the light passed through the picture area bearing the image of the blue or violet values, and the beam C is the shaft projected through the orange value picture area.

The means 13 is a double filter means and includes color filters R, S and T for influencing the projected light adjacent the film at the gate 21. With the light filters L, M and N of the color values mentioned above the filter R is green, the filter S is blue or violet and the filter T is orange, so that the light influenced by them is effectively filtered out or reduced in power by the dissimilar filters L, M and N. The light from the light source 27 must fall on the projecting lens 31 at a sufficient angle to evenly illuminate the field on the viewing screen V and in practice the light rays pass through the picture areas of the film F at such a great angle that the marginal rays of the beams A, B and C at the adjacent ends of the film frames extend to the reflecting prisms 32 and 33 and the marginal light of the beams A and C reaches the violet filter M. This produces undesirable light images outside the field of the viewing screen V. Where the filters R, S and T are employed this marginal light is influenced by the filters adjacent the film F so that it is effectively neutralized or absorbed by the filters L, M and N. The filter means 13 is fully described and claimed in my co-pending application referred to above.

The means 14 adjustably supports or mounts the several optical elements of the projector so that the beams A, B and C and the composite image may be very accurately focused and directed. The means 14 includes an adjustable head arranged at the front of the projector case. This head includes a body 36 that serves to carry the sets of prisms 32 and 33 and the filters L, M and N. The outer part of the body 36 is generally rectangular and the body is hollow or tubular to contain the prisms 32. A cylindrical tubular part 37 projects rearwardly from the rectangular outer portion of the body 36 and is received in a ring 38. The ring 38 is provided at its periphery with a lug 39 and a radially projecting flange 40 is formed on the inner end of the ring. A collar or lip 41 is secured to the outer end of the ring 38 to be in spaced relation to the flange 40. A mounting ring or carrier ring 42 surrounds the ring 38 and is received between the flange 40 and the lip 41. Opposing adjusting screws 43 are threaded through openings in the outer ring 42 and have their inner ends in cooperation with the lug 39. By manipulating the screws 43 the ring 42 is turned relative to the ring 38. A hinge 44 (Fig. 4) secures the inner ring 38 to the front of the projector case so that the entire head may be hinged to an open position to render the interior of the projector and the head accessible for cleaning, etc. A supporting track or bar 45 is secured to the outer ring 42 by screws 46 and projects forwardly at one side of the head body 36. The body 36 is provided with a groove 47 for receiving the bar 45 and rails 48 are attached to the body 36 at the mouth of the groove 47 to retain the body in engagement with the bar (see Fig. 3). With the arrangement just described the head body 36 and the parts carried thereby may be turned about the axis of the optical system and may be shifted longitudinally of said axis.

The prisms 32 are adjustably supported within the head body 36. The body 36 has a central opening 49 aligned with the unit 12, the lens 31, etc. and has lateral openings 50 communicating with the upper and lower sides of the central opening 49. Each prism 32 has a carrier 51 provided with horizontally projecting trunnions 52. Screws 53 are threaded through openings in the wall of the body 36 and have pointed or conical ends cooperating with sockets in the trunnions 52 to support the prism carriers 51 for adjustment about horizontal axes. The prisms 32 may be manually adjusted in any selected manner. In the particular construction illustrated the prisms 32 are automatically adjusted by the compensating means 25. The compensating means 25 includes a shaft 54 extending through a vertical opening 55 in the body 36 and supported for rotation by screws 56 threaded through plugs 57 and having pointed ends engaging the ends of the shaft. Spaced pitched cam grooves 58ª are provided in the shaft 54. Arms 59ª are secured to the trunnions 52 of the prism carriers 51 and have pins 60ª cooperating with the cam grooves 58ª. The grooves 58ª are pitched in opposite directions. It will be seen that turning of the shaft 54 simultaneously turns or pivots the prisms 32 inwardly or outwardly relative to the axis of the optical system.

The shaft 54 for adjusting the prisms 32 has an operative connection 61ª with the film engaging sprocket 25ª of the compensating means 25 and this operative connection 61ª is installed following the various required optical adjustments. The compensating means 25 and its mode of adjusting the prisms 32 are fully described in my Patent No. 2,028,484, mentioned above. Adjustment of the prisms 32 by turning of the shaft 54 serves to change the angle of the light beams A and C so that the beams as reflected from the prisms 33 are simultaneously moved toward or away from the central axis of the optical system and thus may bring the beams into true registration when the spacing of the picture areas of the film F varies by reason of shrinkage of the film.

The means 14 further includes carriers 58 for the outer prisms 33. The carriers 58 are arranged above and below the rectangular outer portion of the head body 36 and are tubular or hollow members having longitudinal or horizontal openings 59. The inner sides of the carriers 58 are open to receive the lateral light beams A and C from the body openings 50. The openings 59 of the carriers 58 are cylindrical and receive correspondingly shaped blocks 60. The blocks 60 are turnable and longitudinally shiftable in the openings 59. The blocks 60 are recessed or cut away to receive the prisms 33. The prisms 33 are supported by plates 61 secured to the blocks 60 and the prisms are arranged to have their normal sides face the prisms 32 and the outer ends of the openings 59.

Means are provided for individually adjusting the blocks 60 longitudinally of the optical system and about their individual axes. The means for adjusting the blocks 60 longitudinally comprise plugs 62 threaded in openings in the carriers 58 and turnable stems 63 passing through the plugs 62 (see Fig. 8). Manipulating knobs 64 are secured to the outer ends of the stems 63. The inner ends of the stems 63 carry heads 63ª provided with eccentric pins 65 which cooperate with circumferential grooves 66 in the blocks 60. Upon turning of a knob 64 the eccentric pin 65 of the stem 63 cooperates with the groove 66 to shift the block 60 in or out in its opening 59. The means just described is such that the prisms 33 may be moved longitudinally to provide very fine or accurate independent vertical adjustments of the end images A and C.

The means for producing rotary adjustment of the prism supporting blocks 60 include lugs 67 on the outer sides of the blocks and adjusting screws 68 threaded through openings in the carriers 58 and cooperating with the lugs 67 (see Fig. 3). Suitable operating knobs 69 are provided on the outer ends of the screws 68 and lock nuts 70 are provided on the screws to secure them in the adjusted positions. Plugs 71 are threaded in openings in the carriers 58 and coiled springs 72 bear against the inner sides of the plugs. The springs 72 serve to hold shiftable plungers 73 in engagement with the lugs 67. The spring urged plungers 73 operate to hold the lugs 67 in engagement with the adjusting screws 68 so that the lens blocks 60 are normally held against vibration and undesirable movement.

It will be seen that the individual prisms 33 may be adjusted either longitudinally of the optical system or about axes parallel with the longitudinal axis of the system to correct the position of the horizontal and vertical meridians of the light image beams A and C. The filters L and N of the means 13 may be suitably secured to the blocks 68 to extend across the outer ends of the openings 59. The filter M for influencing the intermediate beam B may be suitably secured in the head body 36 to extend across the outer end of its opening 49. Hinges 74 support the carriers 58 so that they may be swung to open positions to permit cleaning of the prisms 32 and 33, etc. Fig. 4 of the drawings shows the upper carrier 58 swung to its open position. Retaining screws 75 pass through brackets 76 on the carriers 58 and screw into openings 77 in the body 36 to normally hold the carriers in their closed positions.

In accordance with the invention one of the prism carriers 58 is capable of adjustment about a substantially vertical axis to assist in aligning or registering the vertical meridians of the beams A, B and C. In the case illustrated the upper carrier 58 is supported for adjustment about a generally vertical axis. The hinge 74 of the upper carrier 58 is secured to a plate 78 which in turn rests on the top of the body 36 (see Figs. 3 and 4). The plate 78 has an opening 79 registering with the opening 50 in the top of the body 36. The plate 78 is provided with spaced arcuate slots 80 which pass screws 81 threaded into openings in the body 36. When the screws 81 are loosened the plate 78 may be shifted or turned about a substantially vertical axis. The means for adjusting or shifting the plate 78 and the carrier 58 carried thereby includes a slot 82 in the plate 78. A bracket 83 is attached to the top of the body 36 and overlies the plate 78. A turnable pin 84 passes through an opening in the bracket 83 and has a head 85 on its inner end (see Fig. 9). An eccentric pin 86 projects from the head 85 and cooperates with the slot 82. Upon turning of the pin 84 the eccentric pin 86 cooperates with the slot 82 to shift or turn the plate 78 and the prism carrier 58 attached thereto.

The projection lens 31 is supported in a suitable tubular carrier 87 which in turn is received in a shell 88 secured to the front wall 15 of the projector case. The carrier 87 has a pitched slot 89 and a pin 90 projects inwardly from the shell 88 to cooperate with the slot 89. Gear means is provided for turning the carrier 87 so that the cooperation of the pin 90 with the slot 89 shifts the lens carrier longitudinally. This means includes a shaft 91 passing through an opening in the front wall 15 of the case and provided at its inner end with a gear 92. An operating knob 93 is fixed to the outer end of the shaft 91. The carrier 87 has a series of teeth 94 engaged by a gear of a gear train 95 so that turning of the knob 93 produces turning of the lens carrier 87. When the carrier 87 is turned the pin 90 engaging in the slot 89 causes axial shifting of the carrier.

The lens unit 12 is supported for adjustment longitudinally to slightly raise and lower the horizontal elements of the images. The corrective lens unit 12 is secured in a shell 96 which in turn is carried by a yoke 97, suitably mounted in the case. The shell 96 is shiftable in the yoke 97 to obtain the adjustment. In accordance with the invention the gate 21 is adjustable. The lower end of the gate 21 is pivotally supported at 98 adjacent the axis of the intermittently driven sprocket 23. A pivot pin 99 connects the upper end of the gate 21 with a slide 101. An adjusting screw 102 is threaded through an opening 103 on the slide 101 and cooperates with a stationary block 100. By turning the screw 102 the slide 101 is advanced or retracted so that the gate 22 is pivoted.

In use or operation, film F bearing series of longitudinally spaced pictures of different color values of the subject is advanced through the gate 21 by the sprockets 20 and 23 and light from the source 27 is projected through the film and the optical system so that the light images fall on the viewing screen V. The light after passing through the opening 29 is influenced by the filters R, S and T and any marginal light that takes a path outside the intended paths to reach the prisms 32 is chromatically influenced in such a way that it is absorbed or neutralized by the filters L, M and N. The two sets of filters, L, M and N and R, S and T eliminate or greatly reduce the undesirable light images falling outside the field of the viewing screen V. As described above, the lenses X, Y and Z comprising the corrective lens unit 12 act on the light beams A, B and C immediately adjacent the film F to prevent or correct distortion of the images that would otherwise result from the shortening of the paths of certain portions of the images by passing them through the sets of prisms 32 and 33. The set of lenses X, Y and Z also operates to prevent distortion in the shape of the composite image when the angle of projection is not normal to the plane of the screen V. The head 36 may be adjusted longitudinally to assist in bringing the images A, B and C into registration on the screen V and may be turned by means of the screws 43 to aid in bringing the vertical meridians of the beams A, B and C into register. The blocks 60 carrying the prisms 33 may be adjusted longitudinally or about their longitudinal axes to assist in correcting the positions of the vertical and horizontal meridians of the beams A and C. If the vertical meridians of the beams A, B and C are not in position or register it may be necessary to adjust the plate 78 and the upper carrier 58 to bring the beams in the correct relation. If this is done the head 36 may first be turned to make the vertical meridians of the beams B and C truly vertical and the pin 84 may then be turned to bring the upper carrier 38 to the position where the vertical meridian of the upper beam A coincides with that of the beams B and C. The inner prisms 32 are automatically adjusted by the compensating means 25 so that the projector is automatically adjusted to handle film that has shrunk in varying degrees.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. In a projector for directing a series of light shafts into register on a viewing screen, the projector having reflectors for directing the end shafts of the series laterally, the combination of, outer reflectors for directing said end shafts forwardly, means supporting the outer reflectors for individual adjustment about axes parallel with the axis of the intermediate shaft of the series, and separate screw means for adjusting the outer reflectors.

2. In a projector for directing a series of light shafts into register on a viewing screen, the projector having reflectors for directing the end shafts of the series laterally, the combination of, outer reflectors for directing said end shafts forwardly, means supporting the outer reflectors for individual bodily adjustment along paths parallel with the axis of the intermediate shaft of the series, and means for individually adjusting the outer reflectors along said paths.

3. In a projector for directing a series of light shafts into register on a viewing screen, the projector having reflectors for directing the end shafts of the series laterally, the combination of, outer reflectors for directing said end shafts forwardly, individual mountings for the outer reflectors supporting the same for bodily movement in a direction which is longitudinal with respect to the intermediate light shafts and for turning about longitudinal axes, and means for adjusting the individual outer reflectors in said direction and about said axes.

4. In a projector for directing a series of light shafts into register on a viewing screen, the projector having reflectors for directing the end shafts of the series laterally, the combination of, outer reflectors for directing said end shafts forwardly, individual mountings for the outer reflectors supported by the carriers, means for supporting one of the carriers for turning adjustment about an axis which intersects the intermediate shaft of the series, and means for adjusting said carrier about said axis.

5. In a projector for directing a series of light shafts into register on a viewing screen, a body having an opening for passing said shafts, reflectors in the body for directing the end shafts of the series laterally, outer reflectors for directing said end shafts forwardly, carriers on the body, mountings for the outer reflectors supported by the carriers, means moving the individual mountings about axes extending substantially parallel with the intermediate shaft of the series, and means for moving at least one of the carriers about an axis transverse of and intersecting the intermediate shaft of the series.

6. In a projector for directing a series of light shafts into register on a viewing screen, a body having an opening for passing said shafts, reflectors in the body for directing the end shafts of the series laterally, outer reflectors for directing said end shafts forwardly, means for turning the body about an axis substantially coinciding with the axis of the intermediate shaft of the series, means supporting the outer reflectors in the body for individual movement about axes spaced from and parallel with the axis of the intermediate shaft of the series, and means for moving the outer reflectors about the last named axes.

7. In a projector for directing a series of light shafts into register on a viewing screen, a body having an opening for passing said shafts, reflectors in the body for directing the end shafts of the series laterally, outer reflectors for directing said end shafts forwardly, carriers on the body housing the outer reflectors, mountings supporting the outer reflectors in the carriers for longitudinal shifting and for turning about axes substantially parallel with the intermediate shaft of the series, means for shifting the individual mountings longitudinally, means for turning the individual mountings, and means for turning at least one of the carriers about an axis transverse of the axis of the intermediate shaft.

8. In a projector for directing a series of light shafts into register on a viewing screen, a body having an opening for passing said shafts, reflectors in the body for directing the end shafts of the series laterally, outer reflectors for directing said end shafts forwardly, carriers on the body housing the outer reflectors, mountings supporting the outer reflectors in the carriers for longitudinal shifting and for turning about axes substantially parallel with the intermediate shaft of the series, means for shifting the individual mountings longitudinally, means for turning the individual mountings, means for turning the body about an axis substantially parallel with the intermediate shaft, and means for turning at least one of the carriers about an axis transverse of the axis of the intermediate shaft.

9. In a projector for directing a series of light shafts into register on a viewing screen, the combination of reflectors for directing the end shafts of the series laterally, reflectors for directing the laterally reflected shafts forwardly in converging relation, lens means in the path of the series of shafts for correcting the distortion and unfocused condition in said end shafts which results from the angular relation of the reflectors and screen, the lens means comprising a plano convex lens having a spherically convex surface facing the sources of said shafts, a plano concave lens having a spherically concave surface facing the screen, and a minus lens spaced between the first named lenses and having a cylindrically curved concave surface facing the first named lens, and means supporting the lens means for adjustment along the optical axis of the projector.

10. In a projector for directing a series of light shafts into register on a viewing screen, the combination of reflectors for directing the end shafts of the series laterally, reflectors for directing the laterally reflected shafts forwardly in converging relation, lens means in the path of the series of shafts for correcting the distortion and unfocused condition in said end shafts which results from the angular relation of the reflectors and screen, the lens means comprising a plano convex lens having a spherically convex surface facing the sources of said shafts, a plano concave lens having a spherically concave surface facing the screen, and a minus lens spaced between the first named lenses and having a cylindrically curved concave surface facing the first named lens, and means supporting the lens means for adjustment about an axis transverse of and spaced from the optical axis of the projector.

WALTER L. WRIGHT.